US008234623B2

United States Patent
Orofino, II et al.

(10) Patent No.: US 8,234,623 B2
(45) Date of Patent: Jul. 31, 2012

(54) SYSTEM AND METHOD FOR USING STREAM OBJECTS TO PERFORM STREAM PROCESSING IN A TEXT-BASED COMPUTING ENVIRONMENT

(75) Inventors: Donald Paul Orofino, II, Sudbury, MA (US); Michael James Longfritz, Waltham, MA (US)

(73) Assignee: The MathWorks, Inc., Natick, MA (US)

( * ) Notice: Subject to any disclaimer, the term of this patent is extended or adjusted under 35 U.S.C. 154(b) by 1459 days.

(21) Appl. No.: 11/519,255

(22) Filed: Sep. 11, 2006

(65) Prior Publication Data

US 2008/0127064 A1 May 29, 2008

(51) Int. Cl.
 *G06F 9/44* (2006.01)
 *G06F 15/16* (2006.01)
(52) U.S. Cl. ........ 717/105; 717/103; 717/108; 717/121; 709/231
(58) Field of Classification Search .................. None
 See application file for complete search history.

(56) References Cited

U.S. PATENT DOCUMENTS

| 6,163,776 | A | 12/2000 | Periwal | |
|---|---|---|---|---|
| 6,230,200 | B1 * | 5/2001 | Forecast et al. | 709/226 |
| 6,260,187 | B1 | 7/2001 | Cirne | |
| 6,324,682 | B1 * | 11/2001 | McComb et al. | 717/104 |
| 6,564,368 | B1 * | 5/2003 | Beckett et al. | 717/113 |
| 6,701,367 | B1 * | 3/2004 | Belkin | 709/227 |
| 7,103,910 | B1 * | 9/2006 | Liu et al. | 726/2 |
| 7,370,275 | B2 * | 5/2008 | Haluptzok et al. | 715/264 |
| 7,640,540 | B2 * | 12/2009 | Snover et al. | 717/135 |
| 2003/0005169 | A1 | 1/2003 | Perks et al. | |
| 2003/0140065 | A1 * | 7/2003 | Lovvik et al. | 707/200 |
| 2003/0195865 | A1 * | 10/2003 | Long et al. | 707/1 |
| 2004/0054686 | A1 * | 3/2004 | Hembry | 707/103 R |
| 2004/0064564 | A1 * | 4/2004 | Belkin | 709/227 |
| 2004/0075670 | A1 * | 4/2004 | Bezine et al. | 345/619 |
| 2004/0250239 | A1 * | 12/2004 | Fox et al. | 717/116 |
| 2005/0055398 | A1 | 3/2005 | Olson et al. | |
| 2005/0065972 | A1 * | 3/2005 | Haines et al. | 707/103 R |
| 2005/0071341 | A1 * | 3/2005 | Chkodrov et al. | 707/100 |
| 2005/0096894 | A1 * | 5/2005 | Szpak et al. | 703/13 |

(Continued)

FOREIGN PATENT DOCUMENTS

WO WO-03/052597 A2 6/2003

OTHER PUBLICATIONS

International Search Report for Application No. PCT/US2007/019803, dated Mar. 27, 2008.

*Primary Examiner* — Isaac Tecklu
(74) *Attorney, Agent, or Firm* — Nelson Mullins Riley & Scarborough LLP

(57) ABSTRACT

A mechanism for using stream objects in stream processing operations is provided. A definition of a class of stream objects used in stream processing algorithms can define output and update operations included in instances of the stream objects and the API (application programming interface) through which they may be called. The class definition may further include the type of state information to be held by the instantiated stream objects. An instance of the stream object may be instantiated in a text-based computing environment and the operations may be used to process streams of data.

41 Claims, 8 Drawing Sheets

U.S. PATENT DOCUMENTS

| | | | |
|---|---|---|---|
| 2005/0097187 A1* | 5/2005 | Thompson et al. | 709/217 |
| 2005/0108295 A1* | 5/2005 | Karimisetty et al. | 707/200 |
| 2005/0108627 A1* | 5/2005 | Mireku | 715/513 |
| 2005/0187745 A1* | 8/2005 | Lurie et al. | 703/11 |
| 2006/0059473 A1* | 3/2006 | Moler | 717/149 |
| 2006/0253792 A1* | 11/2006 | Grace et al. | 715/771 |
| 2007/0294311 A1* | 12/2007 | Gates et al. | 707/200 |

\* cited by examiner

SYSTEM AND METHOD FOR USING STREAM OBJECTS TO PERFORM STREAM PROCESSING IN A TEXT-BASED COMPUTING ENVIRONMENT

BACKGROUND

Many computational systems are designed, implemented, and deployed using a programming environment so as to operate on streaming data. The processing of data streams, such as audio data, video data, stock data, radio frequency data, digitized transducer outputs, test and measurement data, SQL query data, gene sequence data, etc., has taken on increasing importance as development environments attempt to simulate or model systems dependent upon streaming data, such as high throughput or time-critical processing systems.

Stream-based processing may be defined as a processing of data samples arriving sequentially over a period of time. A data sample may be scalar in nature, that is, a single data element. It may also be a vector, a matrix, a higher-dimensional regular array of data elements, etc. A data sample may also be irregular or non-uniform in structure, depending upon the nature of the intended application. Continuous-time data may be sampled discretely in time to produce a sampled sequence of streaming data. The sequence of data samples over time may have periodic sampling (that is, uniformly sampled over time) or may be aperiodic with respect to the sampling interval. The duration of a data stream may be finite in time with short duration, or having a sufficiently long duration so as to be considered infinite in practice for a given application. The stream-processing system may therefore be designed to handle an infinite stream of data as a design requirement.

Streaming operations may also require the collection and processing of buffered sub-sequences of data in the data stream, the buffered data being referred to as a data buffer, a batch, or a data frame. A data frame may represent a finite time interval, and the processing of an infinite sequence of data frames may be a requirement of the stream processing system. Data may therefore be input to a stream processing system as individual samples or as frames of data samples. A data sample may include one or more data elements relating to the data at a particular time point.

Different models of computation may be employed by the programming and/or modeling environment being utilized. A modeling environment may be either textual or graphical in nature, and each model of computation may impose certain design restrictions and semantic constraints. Dataflow is an example of one family of models of computation. Specific members of the dataflow family may include dynamic dataflow, synchronous dataflow, boolean dataflow, and the like. A particular dataflow model of computation may impose some restriction on the types of computational semantics that can be modeled and implemented by the system, such as, for example, forbidding feedback, recursion, different mixtures of sample rates, different mixtures of consumption and production rates of the computational process, different mixtures of frame sizes, etc. A dataflow model may also offer certain capabilities to the model designer and/or user, such as, for example, providing higher data throughput, deterministic performance, or greater expressivity in terms of modeling semantics.

Many stream processing systems are implemented using dataflow systems that may be modeled with a dataflow language, where the execution of a particular system component may be triggered by the availability of data as inputs to one or more system components.

For example, in a graphical programming language that implements a dataflow-based stream processing system, the program or model may include model components represented as blocks with inputs and/or outputs. The graphical program or model may also include arrows between the blocks, where the arrows are used to represent the flow of the input and output data. Components in these program or model environments may be executed as soon as all of the inputs become valid depending upon how the development environment is implemented and the specific model of computation employed.

Graphical programming environments that support stream processing operations may include block libraries that contain blocks associated with code for stream processing algorithms. The blocks provide a mechanism for programmers to add components to a model to handle the processing of stream data. The addition of the stream processing blocks to the model in the graphical modeling environment enables the execution of the associated stream processing algorithm. The stream processing algorithm creates a stream component with an internal state, calculates new output values using the state information and then updates the state information.

The semantic constraints and performance limitations imposed by the choice of a dataflow model of computation may limit the applicability of current design tools to the design of practical stream processing systems in text-based computing environments.

BRIEF SUMMARY

One embodiment of the present invention is directed to providing objects in a text-based programming language for performing operations on data, such as, for example, stream data. An object may be defined by an object definition (also referred herein as a "class"). The object definition may include a definition of object operations (also referred herein as "methods") and one or more variables representing a state of an object.

In one embodiment of the invention, the operations of the stream-processing objects may include an update operation and/or an output operation. The update operation updates the state of an object, without producing an output. The output operation produces one or more output data samples and may optionally use state information and inputs to calculate the outputs. The output operation (which may be the default operation of the object) and update operation may also optionally use one or more of the input data samples and/or one or more object parameters.

The class definition may also include a combination operation. The combination operation may combine the functionality of the update operation and the output operation. The combination operation may be a default operation for the object. The default operation is an operation that is performed if a name of an operation is not indicated when calling a method of an object.

The operations as defined above constitute a model of computation when expressed in a textual programming environment, such as an object-oriented implementation in MATLAB®. This model of computation offers advantages applied to the design of stream processing systems, such as expressing feedback systems, certain mixtures of sample rates, certain mixtures of consumption and production rates of the computational process, certain mixtures of frame sizes, etc.

One embodiment of the invention provides an API (Application Programming Interface) for processing of data by instances of the defined objects. For example, the output operation may be called using a syntax including at least an object name and an "output" keyword, and the update operation may be called using a syntax including at least the object name and an "update" keyword. The combination operation may be called using a syntax including the object name and a "process" keyword. Alternatively, the combination operation may be the default operation and may be called without using a specific keyword, such as by invoking an operation call on an object using the object name.

One embodiment of the invention may provide objects capable of polymorphic processing, that is, of processing variables of different specifications, such as for example, both fixed point and floating point values, sample-based and frame-based values, real and complex values, sample-time and single- and multiple-dimension values.

Another embodiment of the invention may provide functionality for generating code from the stream-processing objects. The generated code may be target platform specific, and/or may be generated based on specific target parameters. The target may be real-time simulation, a specific hardware platform, a fixed-point emulation, etc.

The object definition of one embodiment of the invention may be written in an array based programming language. In another embodiment of the invention, the object definition may be written in a dynamically typed programming language. In yet another embodiment of the invention, the object definition may be written in a language compatible with the MATLAB modeling environment and/or SIMULINK modeling environment.

It will be apparent to one of skill in the art that the object definitions and/or objects instantiated from the object definitions may be used both from within a textual environment and a graphical programming and/or modeling environment, or a combination of the above. The input and/or output data may be communicated from/to either graphical or textual modeling environments.

BRIEF DESCRIPTION OF THE DRAWINGS

The invention is pointed out with particularity in the appended claims. The advantages of the invention may be better understood by reference to the following description taken in conjunction with the accompanying drawings, in which:

DETAILED DESCRIPTION

An illustrative embodiment of the present invention provides a mechanism for handling stream processing operations in text-based computing environments. While a stream processing algorithm may be implemented in the graphical programming environment via a block library, it may be difficult to implement a corresponding stream processing algorithm in a text-based computing environment. A definition of a class of objects used in stream processing algorithms may include output and/or update methods, which may be used in instances of the stream-processing object class. The class definition also defines the API through which the operations may be called. Additionally, the class definition defines the type of internal state information maintained by the instances of the stream object class. In short, a class definition specifies at least one method (also referred to as "operations" herein) and state-holding variables of the objects instantiated from the class. As will be understood by one of skill in the art of object-oriented programming, a class of stream-processing objects may be a base class or a class inherited from a base class and/or any intervening parent classes. Users of the system in one embodiment of the invention may be enabled to create their own classes, inheriting from one or more predefined stream-processing object classes.

Methods provided in the predefined object classes of one embodiment of the invention, include at least an "output" method (also referred to as an output operation) and an "update" method (also referred to as an update operation). The output operation produces new output values, such as, for example, output values based on processing one or more stream values. The update operation updates the state of the instantiated stream-processing object (also referred herein as a "stream object" or "instance of a stream object class") based in part on stream input values. The update operation need not produce output values.

A "process" method may be included in the stream-processing object class definition, the process method performing both an update state and output operation. In one embodiment of the invention, the process method may be a functor—that is, the default method for the object.

The stream processing objects may be instantiated in the textual or graphical environments or in combinations thereof.

Figure 1:
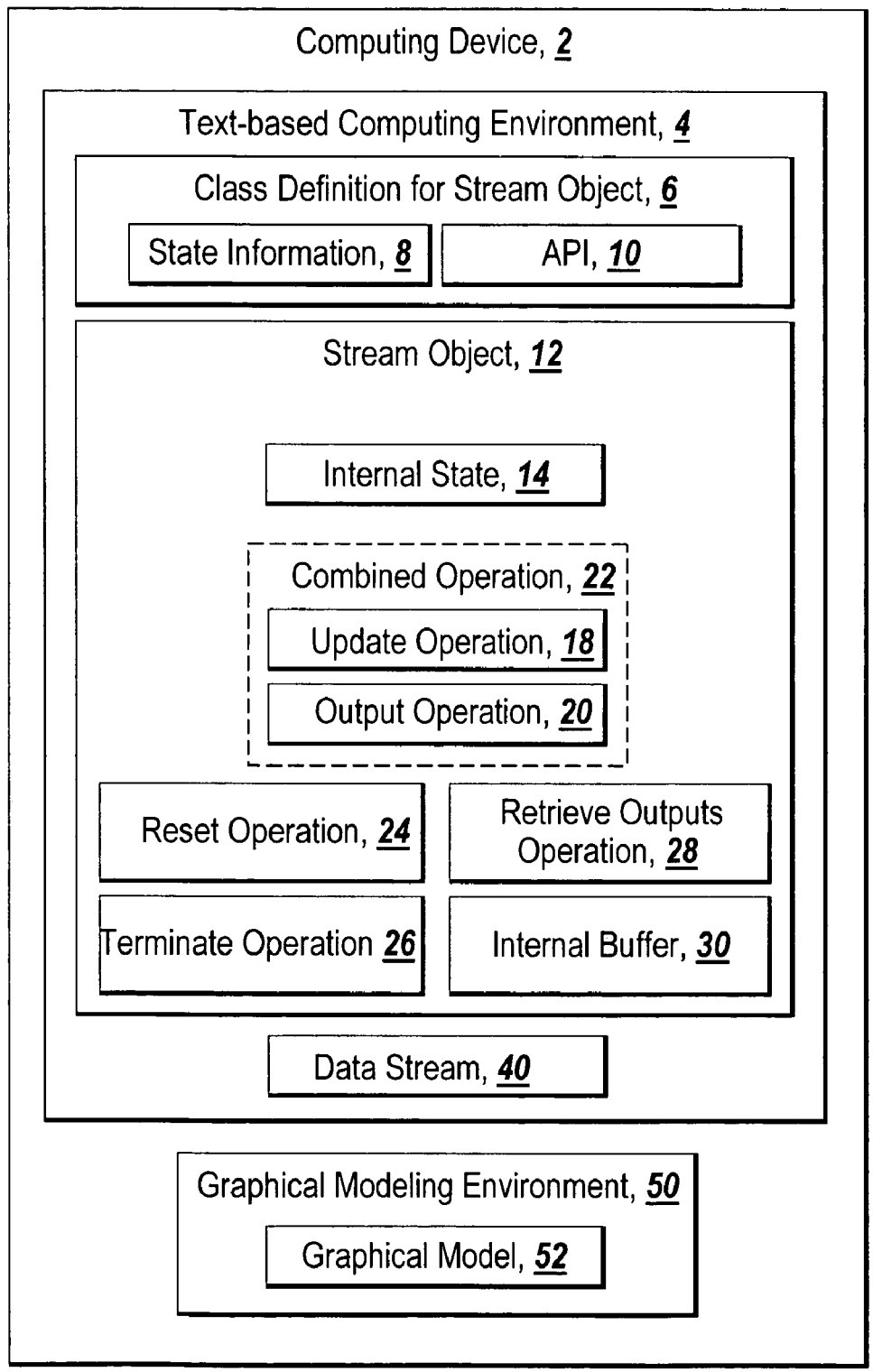
FIG. 1 is a block diagram of a computing device environment suitable for practicing an exemplary embodiment.

FIG. 1 depicts an environment suitable for practicing an illustrative embodiment of the present invention. A computing device 2 hosts a text-based computing environment 4. The computing device 2 may be a server, workstation, laptop, personal computer, PDA or other computing device equipped with one or more processors and able to host the text-based computing environment 4. The text-based computing environment 4 may support dynamically typed programming languages. The text-based computing environment may also support array-based programming languages. The text-based computing environment 4 may be any computing environment that allows processing of textually represented source code. Exemplary text-based computing environments include MATLAB from The MathWorks, Inc. of Natick, Mass. and the LABVIEW MATHSCRIPT environment from National Instruments, Inc. of Austin, Tex.

Additionally, as used herein, the term "text-based computing" specifically encompasses the processing of embedded textual blocks within graphical programming environments. For example, the processing of an embedded MATLAB block within a model in a SIMULINK modeling environment would be considered to be taking place within a text-based computing environment 4 (SIMULINK modeling environment may call MATLAB computing environment upon encountering the embedded MATLAB block, the processing of the embedded MATLAB block may take place in MATLAB computing environment, and the results may be returned to the component in the SIMULINK environment).

The text-based computing environment 4 includes a class definition for stream objects 6. The class definition for stream objects 6 defines the type of state information 8 to be maintained by the stream objects and an API 10 for the stream object. The API 10 provides the interface through which the operations in the stream objects may be called. The API 10 enables the calling of an update and output operation and may allow the calling of other operations of the stream object to be called.

The class definition 6 is used during the instantiation of at least one instance of the stream object class 12 in the text-based computing environment 4. Exemplary types of stream objects can include stream objects such as, for example, filter objects and delay objects. Filter objects provide a filtering of the stream data being processed while delay objects may impose a delay in the stream being processed. It will be appreciated by one of skill in the art that many other types of objects operating on streams of data are within the scope of the present invention. The stream object 12 allows a user to retain and update state information for one or more data streams 40. The data stream 40 may be, but is not limited to, video data, audio data, stock data, radio frequency sensor data, digitized transducer data, gene sequence data, test and measurement data, SQL query data, and/or RSS feed, In one implementation, the data stream 40 may include substantially any type of data with high throughput. In one implementation, the data stream 40 may be real-time data, pseudo real-time data and/or archived data.

The stream object 12 includes an internal state 14 and an update method 18 and an output method 20. The update method 18 updates the internal state of the stream object 12. In updating the internal state of the object, the update method 18 may use one or more of the following: input values from the stream data, an internal state 14 of the stream object 12, and object parameters. The illustrative embodiment thus allows a user to get the benefit of state retention when working with streaming data without requiring that the user write code that determines how to update states based on outputs and/or to maintain states. The output operation 20 may use at least one object parameter and/or the current internal state to calculate a new set of output values. Alternatively, the output operation 20 may also use current input values for calculating the new output values. Exemplary object parameters include initial conditions, filter types, filter coefficients, delay length, algorithm modes, etc. A copy of the calculated output value may be stored in an internal buffer 30.

Algorithms that operate with stream data may call an output operation prior to calling an update operation or vice versa. In one embodiment of the invention, the stream object 12 may include an operation, 22, that, upon being called, calls both the update and output operations, by, for example, calling first the output operation 20 and then calling the update operation 18. It will be appreciated that the update operation 18 and output operation 20 may be written so as to form part of the combined operation 22 or may be separate operations programmatically called by the combined operation 22. In some embodiments of the invention, the combined operation 22 may be designated as a functor—that is, as a default method. In calling the combined operation 22, the users may then omit the explicit method name in a method call and refer only to the object name, and the system of one embodiment of the invention will understand that syntax to refer to the method call to the default combined operation 22. The combined operation 22 may be referred to as the "process" method, or operation, in the API 10. The output and update operations may also be designated the default method, instead of the process method.

Additional operations that may be defined by the API 10 and implemented by the stream object 12 include a reset operation 24, a terminate operation 26 and a retrieve outputs operation 28. The reset operation 24 may reset an object's internal state 14 back to an initial and/or other default value. For example, a filter object might reset its state to its initial condition (which may be specified as an object parameter). Similarly, a file reader may reset its index back to the beginning of a file and an object calculating a running mean may reset its internal running sum to zero. Upon being called, the terminate operation 26 may release resources that are associated with the stream object 12. Exemplary resources that may be released by the terminate operation 26 can include allocated memory, file handles and hardware connections. Calling the terminate operation indicates that processing has completed. Any allocated resources can be released. The retrieve output operation 28 retrieves the last previously calculated output value. In one embodiment of the invention, the last previously calculated output value is retrieved from an internal buffer 30.

The computing device 2 may also support a graphical modeling environment 50 that includes a graphical model 52. Alternatively, the graphical modeling environment may be located on a separate computing device accessible to the computing device 2. Exemplary graphical modeling environments can include, among other things, SIMULINK and STATEFLOW, both from The MathWorks, Inc. Following the processing of the data stream 40, the resulting output may be transmitted as input to a component in the graphical model 52. For example, the output from a stream object in code being executed in MATLAB may be directed as input for a block diagram component in a block diagram model being executed in SIMULINK. It should be appreciated that the update and output operations may also be invoked remotely through Remote Procedure Call (RCP) or Remote Method Invocation (RMI) mechanisms.

Figure 2:
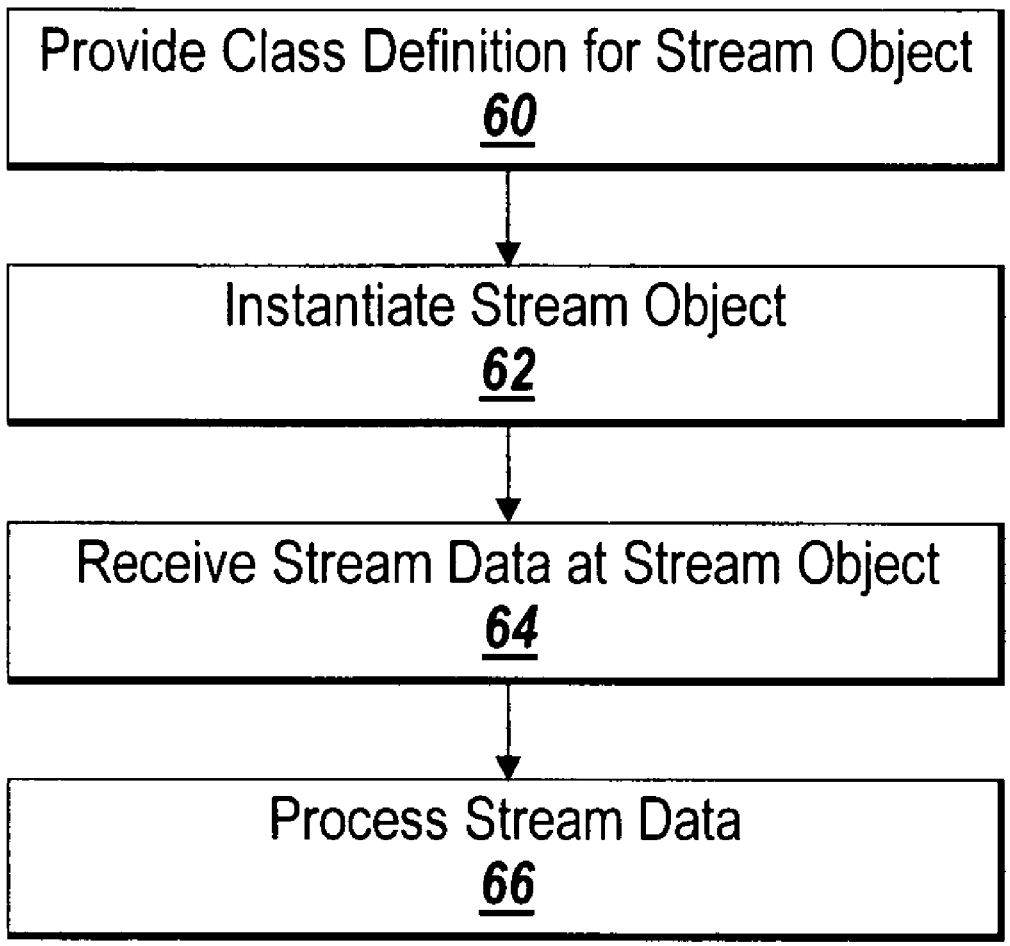
FIG. 2 is a flowchart of a sequence of steps that can be implemented via the exemplary embodiments of FIG. 1 to process stream data.

FIG. 2 is a flowchart of the overall sequence of steps followed by the illustrative embodiment to process stream data. The sequence may begin by providing a class definition for the stream object that includes the definition of state information 8 and an API 10 that allows the calling of the stream object's output and update operations (step 60). The class definition is configurable by a user. Code being executed in a text-based computing environment instantiates the stream object based on the class definition (step 62). A stream of data is subsequently provided as input to the stream object (step 64), which proceeds to execute its output and update operations to process the stream data (step 66).

Figure 3:
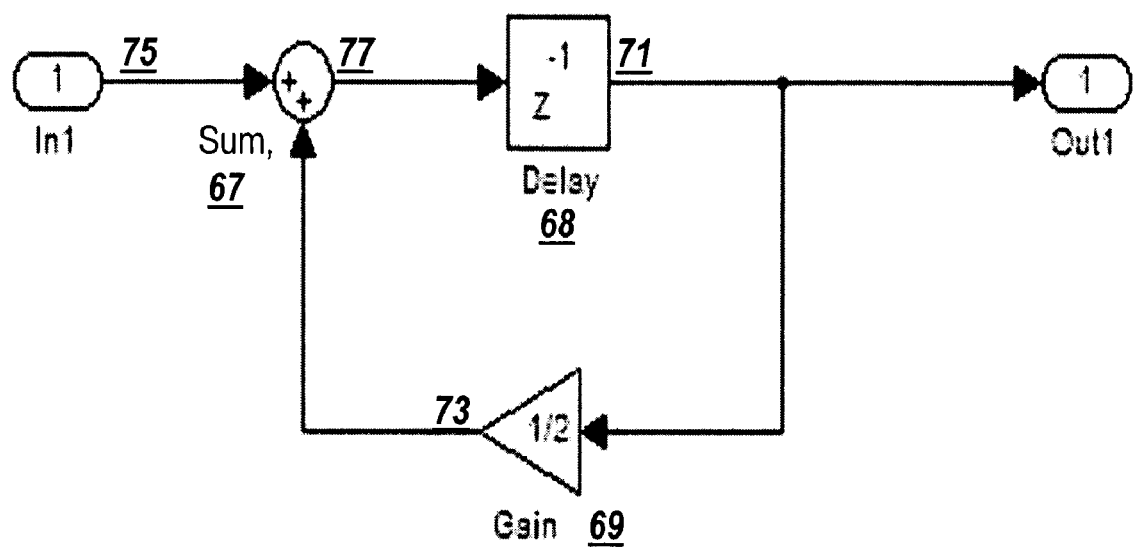
FIG. 3 depicts a feedback loop.

An example of an algorithm that may use separate update and output operations is a feedback loop with a delay (such as a one-pole IIR filter). The feedback loop may be graphically depicted as shown in FIG. 3.

Sample code for the IIR filter may be shown as:

```
% construct objects using 'package.classname' syntax
% pick a wave (audio) file for input and output
delay = splib.delay;
gain = splib.gain;
sum = splib.sum;
input = splib.fromwavefile;
output = splib.towavefile;
%# setup objects; default values are good for most parameters
gain.Value = 0.5;
% start processing the file
while (~input.done)
    % calculate outputs
```

```
out = delay.output;
towavefile.process(out); % towavefile is a sink, no outputs
out = gain. process (out);
in = fromwavefile. process; %fromwavefile is a source, no inputs
out = sum. process (in, out);
% update states
delay.update(out);
end
```

The feedback loop may involve splitting the algorithm into two steps; otherwise, it may not be possible to resolve the feedback loop (i.e.: the delay block 68 may need the output from the sum block 67, but the sum block 67 (indirectly) may need the output from the delay block 68). The two steps are (i) calculating outputs, and then (ii) updating states. In the output step, the delay block 68 calculates its output based on its state. In the first iteration, the delay block 68 calculates its output using its initial state value. As depicted in FIG. 3, the delay output is written to an output memory location via the output port 71 and passes through the gain block 69. The gain output 73 and the input block output 75 would be added together to create the sum block output value 77. In the update step, each component that has state (only the delay, in this case) updates its state. The delay block 68 stores the current output of the sum block 77 as its state to use as its output value 71 in the next iteration.

As noted above, in one implementation a combined operation 22 (referred to below and in the sample code above as a process operation) may be used in place of separate explicit calls to the output and update methods. Thus, in place of separately calling:
out=object.output(in);
object.update(in);
for every object in every loop, the combined operation allows the following call to be made:
out=object.process(in);
The process operation will make a call to the output operation, and then a call to the update operation. In the sample code (above) for the IIR filter example, the delay object uses output and update separately, while all of the other objects use the combined operation 'process' call. The use of the combined operation provides a more efficient mechanism for outputting data from the stream object 12 and updating the internal state of the stream object.

Figure 4:
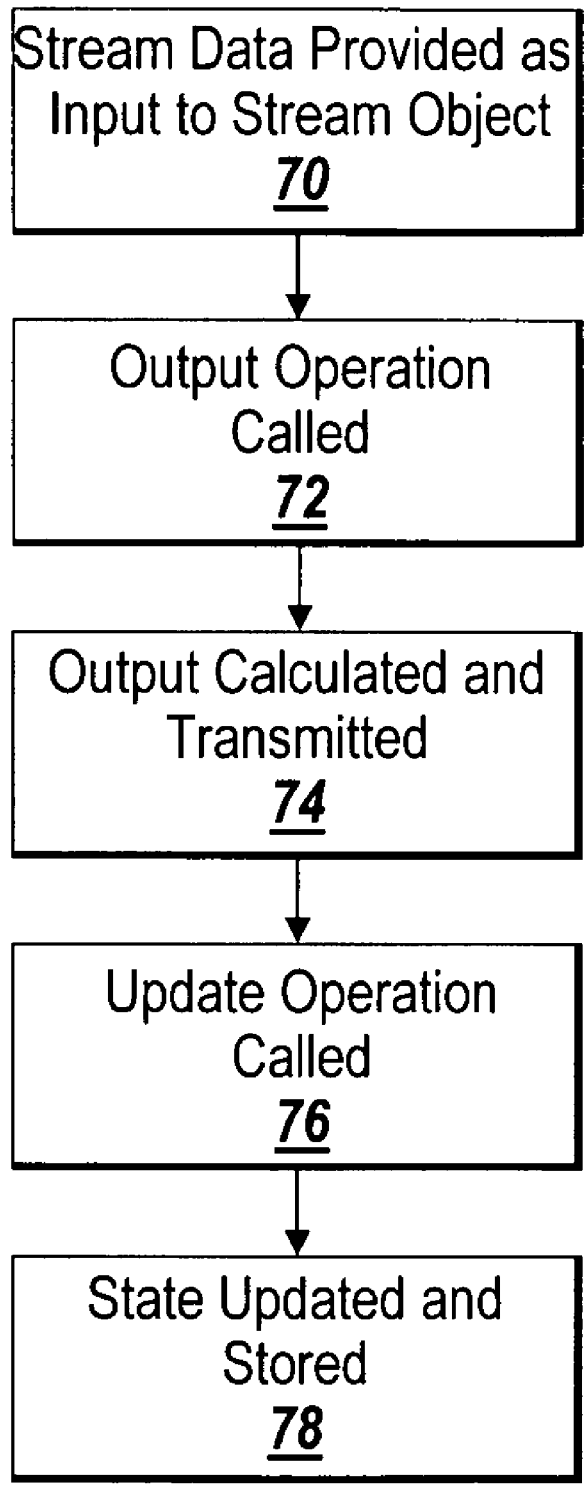
FIG. 4 is flowchart of a sequence of steps that can be practiced in the exemplary embodiment of FIG. 1 using the stream object's API to process stream data.

FIG. 4 is a flowchart of a sequence of steps followed by the illustrative embodiment of the present invention in using the API supported by an instantiated stream object to process stream data. The sequence begins with the stream data being provided as input to the stream object (step 70). As noted above, the stream data may be a substantially continuous stream of data that a user is interested in processing. While the stream data may be processed in a serial datum by datum fashion, the illustrative embodiment is not limited to serial processing. The stream data may also be stored in a buffer or other location upon arrival and assembled into data units, such as frames. Stream data may further be arranged, stored, and/or formatted in other ways to allow stream data to be processed as a group. The output operation for the stream object that is supported by the API is then called in order to calculate new output values (step 72). The output method uses the current internal state and/or object parameters of the stream object in the calculation of the new output value (and optionally the current input values). The retention of state by the stream object allows more complex operations to be performed on the stream data as previous processing of the stream data can be used as a factor in calculating a new output value. Put another way, the state provides a memory (or history) of what has previously occurred and prevents the stream object from having to consider the new stream input data in a context that may lack historical information or parameters. The output operation transmits the newly calculated output value to the destination indicated by the algorithm being executed (step 74). After the calculation and transmittal of the new output value, the update operation is called (step 76). In one implementation, the update operation may use at least one input value (from the stream data), the current internal state of the stream object and/or at least one object parameter in order to update the state of the stream object. Once updated, the new internal state may be stored (step 78). In one implementation, the new internal state is stored in an internal buffer. This retention of state provides the ability to perform cumulative operations easily on the stream data where the previously processed data is a factor in the current processing of the stream data.

Figure 5:
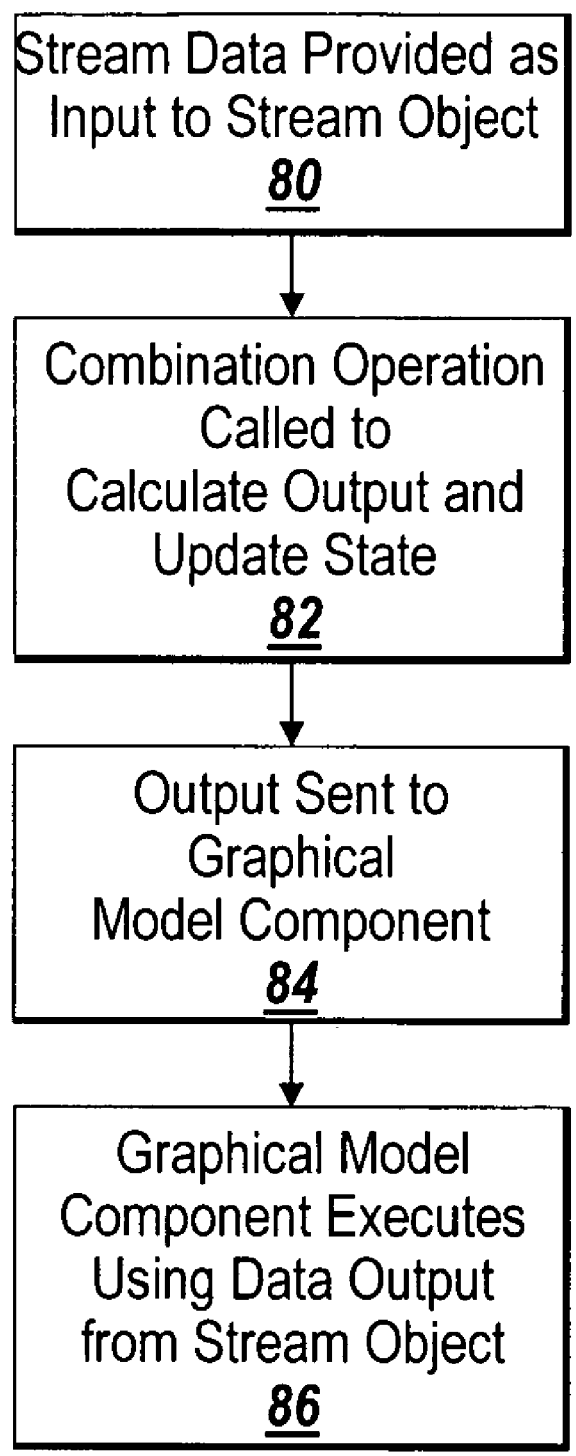
FIG. 5 is a flowchart of a sequence of steps that can be practiced in the exemplary embodiment of FIG. 1 to process stream data in a text-based computing environment and to forward the processed data to a graphical model component.

Once calculated, the output values may be provided as input values to components in other environments that are performing additional processing. FIG. 5 is a flowchart of a sequence of steps that can be followed by an illustrative embodiment of the present invention to process stream data in a text-based computing environment and to forward the processed data to a graphical model component. The sequence begins with the stream data being provided as input to the stream object (step 80). The input may be provided from either the textual or the graphical environments or the combination of the above. The algorithm being executed in the text-based computing environment may call a combination operation to calculate output and update state information (step 82). The calculated output is sent to a graphical model component (step 84) which executes using the output data processed by the stream object in the text-based computing environment as input data (step 86). In one implementation, the graphical model component may be in a data flow diagram or in a block diagram model.

Figure 6:
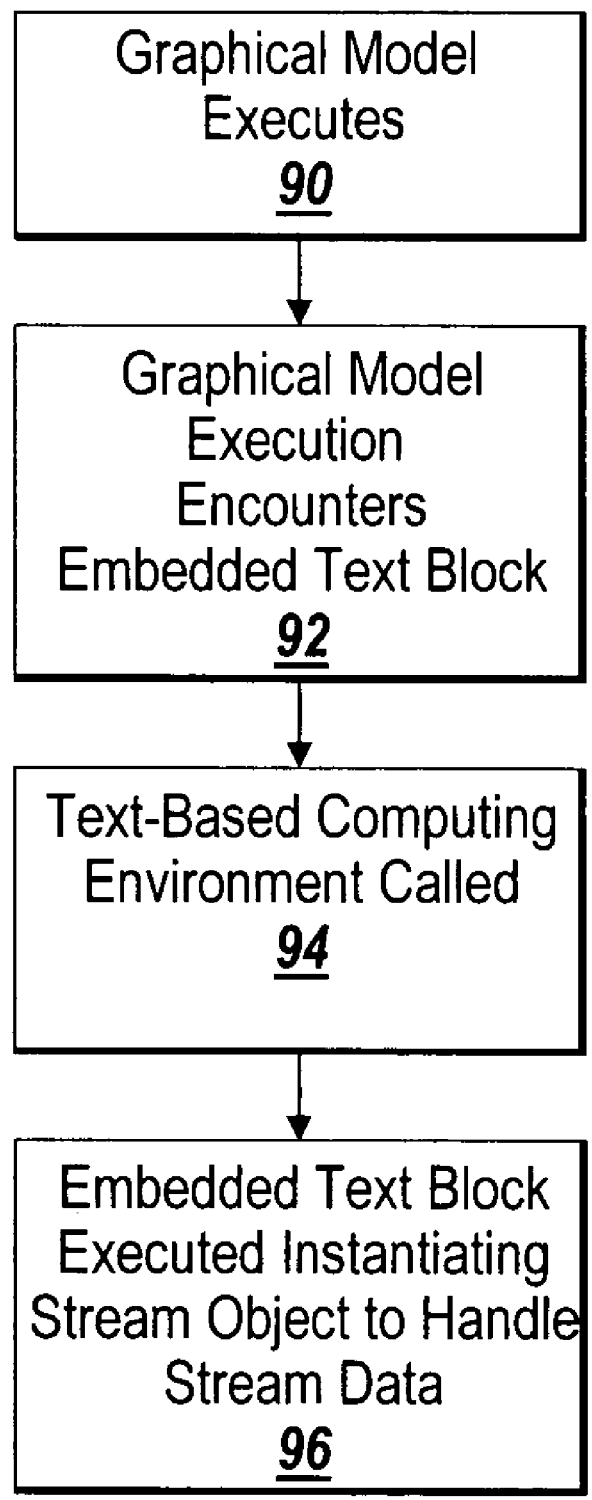
FIG. 6 is a flowchart of a sequence of steps that can be practiced in the exemplary embodiment of FIG. 1 to process stream data using an embedded text block in a graphical model.

In one exemplary implementation, the instantiation of the stream object 12 may be triggered by the execution of an embedded text block located within a graphical model. The embedded text block may be any block embedded within a graphical model that requires a call to a separate text-based computing environment in order to process the code in the block. For example, the execution of an Embedded MATLAB block located with a SIMULINK model may cause the instantiation of a stream object in a text-based computing environment to which stream data is then directed. FIG. 6 depicts a sequence of steps that may be followed by an illustrative embodiment to execute an embedded text block. The sequence begins with the execution of a graphical model (step 90). During the processing of the execution list for the graphical model, an embedded text block is encountered (step 92). The processing of the embedded text block triggers a call to a text-based computing environment (step 94). The embedded text block then executes in the text-based computing environment and instantiates a stream object 12 as discussed above to perform streaming operations (step 96).

In another aspect of the invention, the API 10 may support the use of 'functor' notation for a default operation. The support of the functor notation by the API 10 allows the use of an object as a function—that is, using the name of the variable that holds that object as a function call as illustrated below:

```
Original:
  in = [1:5]';            % create an input signal
  acf = splib.autocorrelation; % create an autocorrelation stream
                                      component
  out = acf.process(in);    % process the input to get the output
```

```
Functor:
  in = [1:5]';              % create an input signal
  acf = splib.autocorrelation;  % create an autocorrelation stream
                                  component
  out = acf(in);            % process the input to get the output
```

Instead of explicitly calling the process operation as shown by the statement 'out=acf.process(in)', it is implicitly called by using the variable (acf) as a function as shown in the statement 'out=acf(in)'. In complicated algorithms, this shorthand notation may improve readability of the algorithm. In one implementation of the present invention, this approach may be used to call the combination (process) operation 22.

Figure 7:
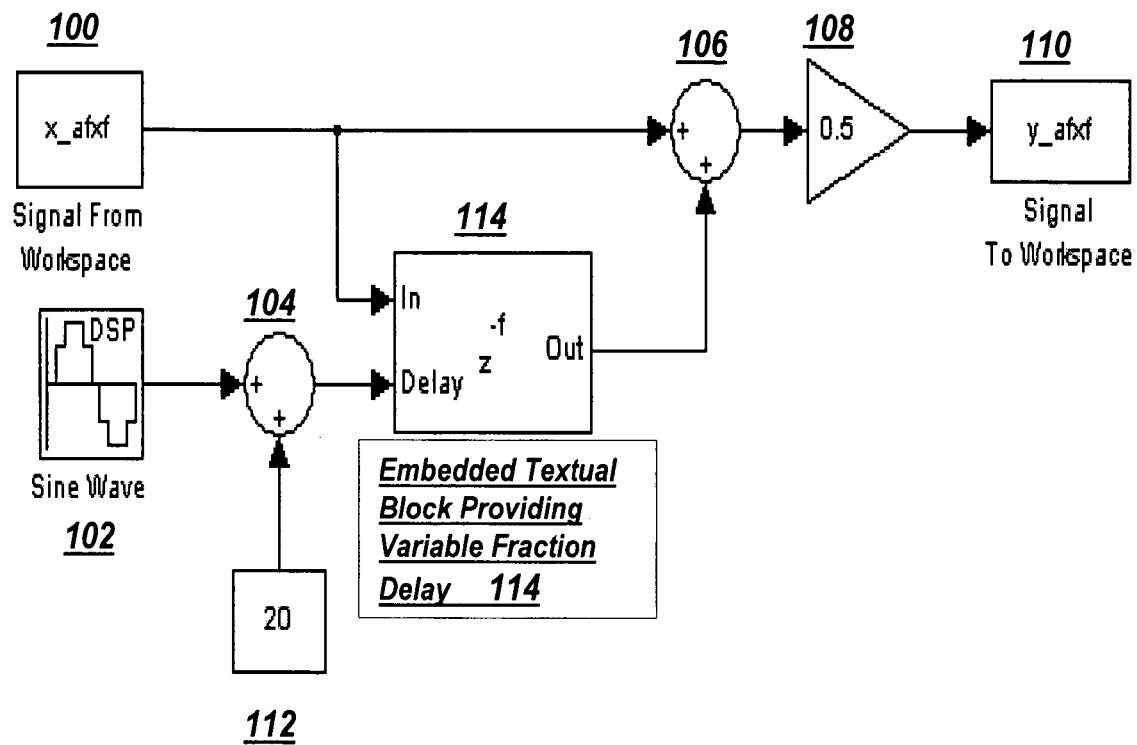
FIG. 7 shows a graphical model of an audio flanger that includes an embedded textual block in the model.

The processing of an embedded textual block within a graphical modeling environment is further discussed with reference to FIG. 7. FIG. 7 shows a graphical model of an audio flanger—a system that offsets signals from each other—which includes an embedded textual block. The model includes a signal 100 containing a stream of audio data. The model also includes a sine wave block 102 and constant block 112 which together provide input to a sum block 104. The sum block 104 provides its output as the delay value for an embedded textual block providing a variable fraction delay 112. The signal 100 is provided as input to the embedded textual block providing a variable fraction delay 112. The delayed output from the embedded textual block providing a variable fraction delay 112 is then added to a sum block 106 and combined with the non-delayed audio signal 100. The output of the sum block 100 is provided to a gain block 108 which then returns its output to the originating workspace 110.

Execution of the embedded textual block may provide a variable fraction delay 112 that can cause the text-based computing environment to be called to execute the block. The execution of the block instantiates an instance of the stream object class discussed above. The stream object allows state information to be retained about the stream of audio data which in one implementation is being buffered and assembled into frames. The retention of the state information allows a desired amount of variable delay to be added to each frame and the calling of the stream object's update and output operations allows the state to be updated as necessary and the new output calculated respectively.

The embedded textual block providing a variable fraction delay 112 code being processed in the text-based computing environment may be represented as:

```
% Accepting default values for unspecified parameters in constructor calls
% In particular, inputs default to be interpreted as frame-based columns
load music_signal;          % loads audio input x_afxf, sample rate
                              Fs, etc.
sineGen = dspSineGen('Freq',0.25, 'phase',pi/4, ...
                      'SampleRate', Fs, 'FrameSize',128 );
varDelay = dspVariableDelay('MaxDelay',100, ...
                      'method','FIR', 'Filter', intfilt(8,10,0.5));
audioSrc = dspBufferedInput('Data',x_afxf, 'SampleRate', Fs,
'FrameSize',128);
audioSink = dspBufferedOutput('Data', 'y_afxf');
while( ~done ( audioSrc )),    % there exists a 'done' method...
  signalIn = output( audioSrc );   % invoke 'output' method on
                                      AudioIn
  delay = 20 + output(sineGen);  % compute next output from sine
                                    generator
  signalOut = 0.5 * ( signalIn + output(varDelay, delay, signalIn) );
  update( audioSnk, signalOut );  % invoke 'update' method on
                                    AudioOut
end
```

```
sound(y_afxf, Fs);          % play result when simulation
                              finishes
```

HIGH-LEVEL M

```
% This simulation cannot be manipulated to execute as a
% sequence of single simulation steps on "all the data" for each operation
%
% The signal must be explicitly split into frames so that the variable delay
% can properly execute separately on each frame
load music_signal;          % loads audio input x_afxf,
                              sample rate Fs, etc.
frame_size = 128;
dlyFilt = intfilt(8,10,0.5);   % pre-compute the interpolation filter
varDelayState = VarDelayInit;  % initial state info for variable fractional
                                 delay
% Slice data into frames, all at once, one frame per column.
%
% simulation initialization step:
all_input_data = buffer(x_afxf, 128);
for i=1:size(all_input_data,2),  % loop over each frame
  sigIn = all_input_data(:,i); % get next frame of audio data
  % compute next sine wave generator output (.25 Hz flanging rate)
  wt = 2*pi * 0.25 * ((0:frame_size−1) + (i−1)*frame_size))/Fs;
  dly = 20 + sin(wt + pi/4);
  %
  % assume a pair of functions named "VarDelayOutput/Update":
  %
  dlyOut = VarDelayOutput(varDelayState, sigIn, dly);
  varDelayState = VarDelayUpdate(varDelayState, sigIn);
  y_afxf(:, i) = 0.5 * ( sigIn + dlyOut );
end
y_afxf = y_afxf(:);         % reshape frame matrix into one signal
sound(y_afxf, Fs);          % play result when simulation finishes
***************************
```

Figure 8:
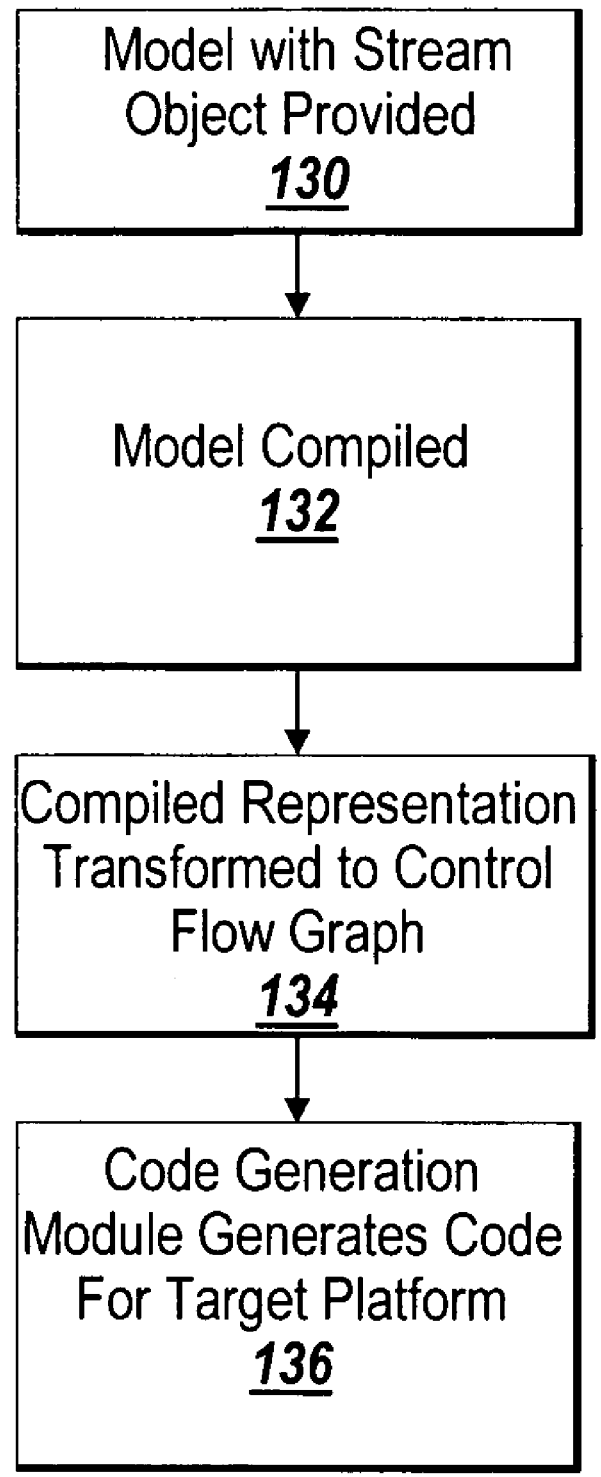
FIG. 8 is a flowchart of a sequence of steps that can be practiced in the exemplary embodiment of FIG. 1 to generate code using a stream object.

In another aspect of the present invention, the model with the stream objects may be used to generate code as illustrated in the exemplary sequence depicted in FIG. 8. The sequence may begin with the providing of a model that includes an instance of the stream class discussed above (step 130). The model is then compiled to determine values for all essential model elements and to determine an ordering in which to execute the model blocks (step 132), and the compiled representation is transformed to a control flow graph intermediate representation (step 134). The code generation module may then generate code based on the control flow graph, this code may be generated for a particular target platform (step 136).

In addition to parameters that capture the particular hardware and operating system for which code is generated, the code can be generated based on parameters such as, but not limited to, whether it should be fixed-point or floating-point, whether memory usage should be minimized, whether debugging, profiling, and other instrumentation code should be included, whether function parameters should be stored locally or made available globally, whether functions should be reused wherever possible, whether argument lists to functions should be flat or are allowed to be structured.

Another aspect of the code generation technology is that it is very extensible. Provided with the SIMULINK product family is the Target Language Compiler (TLC). This technology enables the creation of "active scripts" that control how the generated code is produced for a model with stream objects. A user using TLC is able to customize the generated code to suit their specific needs.

Exemplary embodiments may be provided as one or more computer-readable programs embodied on or in one or more mediums. The mediums may be a floppy disk, a hard disk, a compact disc, a digital versatile disc, a flash memory card, a Programmable ROM (PROM), a Magnetic RAM (MRAM), a Random Access Memory (RAM), a Read Only Memory (ROM), a magnetic tape, etc. In general, the computer-readable programs may be implemented in substantially any programming language. Examples of languages that can be used include but are not limited to, MATLAB language, FORTRAN, C, C++, C#, Python, JavaScript, Java, etc. Examples of graphical programming environments include, but are not limited to, Simulink, LabView, Hyperception, Signal Processing Designer, VisualSim, SCADE, etc. The software programs may be stored on or in one or more mediums as object code. Hardware acceleration may be used and all or a portion of the code may run on a Field Programmable Gate Array (FPGA), an Application Specific Instruction set Processor (ASIP), an Application Specific Integrated Circuit (ASIC), etc. The code may run in a virtualized environment such as in a virtual machine. Multiple virtual machines running the code may be resident on a single processor and multiple processors having two or more cores may be implemented on the same chip.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

We claim:

1. A computer-implemented method of processing data, said method comprising:
providing an a stream processing object class definition of a stream processing object class for facilitating at least one operation on a data stream, the object class definition specifying operations defining at least a portion of an Application Programming Interface (API), the object class definition including at least an update operation for updating a retained internal state of an object instance of the stream processing object class without producing an output, a stream processing operation, and an output operation for producing at least one output value for an object instance of the stream processing object class, the update operation and output operation being separately invocable;
instantiating an object of the stream processing object class in a textual dynamically-typed language environment to produce an object instance; and
using the object instance to operate on the data stream via the API; and
generating code for the object instance based on a set of parameters.

2. The computer-implemented method of claim 1, wherein the object class definition is inherited from a parent object class definition.

3. The computer-implemented method of claim 1, wherein the object class definition includes a default operation.

4. The computer-implemented method of claim 3, wherein the default operation is a process operation.

5. The computer-implemented method of claim 1, wherein the object class definition enables data type polymorphism.

6. The computer-implemented method of claim 5, wherein the data type polymorphism comprises accommodations for one or more of the following data type variations: fixed point and floating point values, real and complex values, sample and frame-based values, sample time and single-dimension and multiple-dimension values.

7. The computer-implemented method of claim 1, wherein the object class definition further comprises at least one or a combination of the following operations: a reset operation, a terminate operation, and a retrieve output operation.

8. The computer-implemented method of claim 1, wherein the update operation is called by using a syntax comprising at least an object name and an "update" keyword.

9. The computer-implemented method of claim 1, wherein the output operation is called by using a syntax comprising at least an object name and an "output" keyword.

10. The computer-implemented method of claim 1, wherein the object class definition further comprises a combination operation, the combination operation combining functionality of the update and output operations.

11. The computer-implemented method of claim 10, wherein the combination operation is a default operation.

12. The computer-implemented method of claim 1, wherein the object class definition operations are capable of processing frame-based input.

13. The computer-implemented method of claim 1, wherein using the object instance further comprises:
using the object instance from within a graphical programming environment.

14. The computer-implemented method of claim 1, wherein using the object instance further comprises:
generating code for the object instance from within a graphical programming environment.

15. The computer-implemented method of claim 14, wherein the graphical programming environment is at least one of: Simulink, LabView, Hyperception, Signal Processing Designer, VisualSim, and SCADE.

16. The computer-implemented method of claim 1, wherein the data stream is at least one or a combination of: video data, audio data, telecommunications signal data, transducer signal data, stock data, test and measurement data, gene sequence data, an RSS feed, and SQL query data.

17. The computer-implemented method of claim 1, wherein at least a subset of the object definition is written in a language compatible with at least one of: MATLAB programming language and MathScript programming language.

18. The computer-implemented method of claim 1, where the object class definition further comprises:
an end-of-data operation.

19. The computer-implemented method of claim 1, where the object class definition further comprises:
an end-of-data operation, where the end-of-data operation is called using a syntax comprising:
an object name and a "done" keyword.

20. The computer-implemented method of claim 1, where the object class definition further comprises:
an end-of-data operation, where the end-of-data operation is called using a syntax comprising:
an object name and an "isdone" keyword.

21. The computer-implemented method of claim 1, where the object class definition further comprises:
an end-of-data operation, where the end-of-data operation indicates whether a data source is exhausted.

22. A computer-implemented method of processing data, said method comprising:
providing an a stream processing object class definition of a stream processing object class for facilitating at least one operation on a data stream, the object class definition specifying operations defining at least a portion of an Application Programming Interface (API), the object class definition including at least an update operation for updating a retained internal state of an object instance of the stream processing object class without producing an output, a stream processing operation and an output operation for producing least one output value for an object instance of the stream processing object class, the update operation and output operation being separately invocable;

instantiating an object of the stream processing object class in a textual dynamically-typed language environment to produce an object instance;

using the object instance to operate on the data stream via the API; and generating code for the object instance based on a set of parameters.

23. The computer-implemented method of claim 22 wherein generating code for the object instance further comprises:

generating target-specific code for the object instance.

24. A non-transitory computer-readable medium holding instructions that when executed by a processor process data, by:

providing an object class definition of a stream processing object class for facilitating at least one operation on a data stream, the object class definition specifying operations defining at least a portion of an Application programming Interface (API), the object class definition including at least an update operation for updating a retained internal state of an object instance of the stream processing object class without producing an output, a stream processing operation and an output operation for producing at least one output value for an object instance of the stream processing object class, the update operation and the output operation being separately invocable;

instantiating an object of the stream processing object class in textual dynamically-typed language environment to produce an object instance; and using the object instance to operate on the data stream via the API; and generating code for the object instance based on a set of parameters.

25. The medium of claim 24, wherein the object class definition is inherited from a parent object definition.

26. The medium of claim 24, wherein the object class definition enables data type polymorphism.

27. The medium of claim 26, wherein the data type polymorphism comprises accommodations for one or more of the following data type variations: fixed point and floating point values, real and complex values, sample and frame-based values, single-dimension and multiple-dimension values.

28. The medium of claim 24 wherein the object class definition further comprises at least one or a combination of the following operations: a reset operation, a terminate operation, and a retrieve output operation.

29. The medium of claim 24 wherein the object class definition further comprises a combination operation, the combination operation combining functionality of the update and output operations.

30. The medium of claim 24 wherein the object class definition operations are capable of processing frame-based input.

31. The medium of claim 24 wherein using the object instance further comprises:

using the object instance from within a graphical programming environment.

32. The medium of claim 24 wherein using the object instance from within the graphical programming environment further comprises:

generating code for the object instance from within the graphical programming environment.

33. The medium of claim 24 wherein the graphical programming environment is at least one of: Simulink, LabView, Hyperception, Signal Processing Designer, VisualSim, and SCADE.

34. The medium of claim 24 wherein the data stream is at least one or a combination of: video data, audio data, telecommunications signal data, transducer signal data, stock data, test and measurement data, gene sequence data, an RSS feed and SQL query data.

35. The medium of claim 24 wherein at least a subset of the object class definition is written in a language compatible with at least one of: MATLAB programming language and MathScript programming language.

36. The medium of claim 24, where the object class definition further comprises:

an end-of data operation.

37. The medium of claim 24, where the object class definition further comprises:

an end-of-data operation, where the end-of-data operation is called using a syntax comprising:

an object name and a "done" keyword.

38. The medium of claim 24, where the object class definition further comprises:

an end-of-data operation, where the end-of-data operation is called using a syntax comprising:

an object name and an "isdone" keyword.

39. The medium of claim 24, where the object class definition further comprises:

an end-of-data operation, where the end-of-data operation indicates whether a data source is exhausted.

40. A non-transitory computer-readable medium holding instructions that when executed on a processor process data by:

providing an object class definition of a stream processing object class for facilitating at least one operation on a data stream, the object class definition specifying operations defining at least a portion of an Application Programming Interface (API), the object class definition including at least an update operation for updating a retained internal state of an object instance of the stream processing object class without producing an output, a stream processing operation and an output operation for providing at least one output value for an object instance of the stream processing object class, the update operation and the output operation being separately invocable;

instantiating an object of the stream processing object class in a textual dynamically typed language environment to produce an object instance;

using the object instance to operate on the data stream via the API; and generating code for the object instance based on a set of parameters.

41. The medium of claim 40 wherein generating code for the object instance further comprises:

instructions for generating target-specific code for the object instance.

* * * * *

UNITED STATES PATENT AND TRADEMARK OFFICE
CERTIFICATE OF CORRECTION

PATENT NO. : 8,234,623 B2  
APPLICATION NO. : 11/519255  
DATED : July 31, 2012  
INVENTOR(S) : Donald Paul Orofino, II et al.

It is certified that error appears in the above-identified patent and that said Letters Patent is hereby corrected as shown below:

At column 11, line 36 (claim 1, line 3), please change "providing an a stream processing" to -- providing a stream processing --.

At column 12, line 63 (claim 22, line 3), please change "providing an a stream processing" to -- providing a stream processing --.

Signed and Sealed this
Thirteenth Day of November, 2012

David J. Kappos
*Director of the United States Patent and Trademark Office*